United States Patent
Li et al.

(10) Patent No.: US 10,854,207 B2
(45) Date of Patent: Dec. 1, 2020

(54) METHOD AND APPARATUS FOR TRAINING VOICEPRINT RECOGNITION SYSTEM

(71) Applicant: TENCENT TECHNOLOGY (SHENZHEN) COMPANY LIMITED, Shenzhen (CN)

(72) Inventors: Wei Li, Shenzhen (CN); Binghua Qian, Shenzhen (CN); Xingming Jin, Shenzhen (CN); Ke Li, Shenzhen (CN); Fuzhang Wu, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 16/231,913

(22) Filed: Dec. 24, 2018

(65) Prior Publication Data

US 2019/0130920 A1    May 2, 2019

Related U.S. Application Data

(63) Continuation of application No. PCT/CN2017/096232, filed on Aug. 7, 2017.

(30) Foreign Application Priority Data

Aug. 5, 2016 (CN) .......................... 2016 1 0639606

(51) Int. Cl.
  *G10L 17/22* (2013.01)
  *G10L 17/04* (2013.01)
  (Continued)

(52) U.S. Cl.
  CPC .............. *G10L 17/22* (2013.01); *G10L 17/00* (2013.01); *G10L 17/02* (2013.01); *G10L 17/04* (2013.01); *G10L 17/08* (2013.01)

(58) Field of Classification Search
  CPC ........ G10L 17/04; G10L 17/005; G10L 17/00
  See application file for complete search history.

(56) References Cited

U.S. PATENT DOCUMENTS 5,897,616 A * 4/1999 Kanevsky ............... G10L 17/24
                                                       379/88.02
2008/0249774 A1 10/2008 Kim et al.
(Continued)

FOREIGN PATENT DOCUMENTS

CN   103730114 A   4/2014
CN   104538035 A   4/2015
(Continued)

OTHER PUBLICATIONS

The World Intellectual Property Organization (WIPO) International Search Report for PCT/CN2017/096232 dated Nov. 16, 2017 8 Pages (including translation).
(Continued)

Primary Examiner — Matthew H Baker
(74) Attorney, Agent, or Firm — Anova Law Group, PLLC

(57) ABSTRACT

A method and an apparatus for training a voiceprint recognition system are provided. The method includes obtaining a voice training data set comprising voice segments of users; determining identity vectors of all the voice segments; identifying identity vectors of voice segments of a same user in the determined identity vectors; placing the recognized identity vectors of the same user in the users into one of user categories; and determining an identity vector in the user category as a first identity vector. The method further includes normalizing the first identity vector by using a normalization matrix, a first value being a sum of similarity degrees between the first identity vector in the corresponding category and other identity vectors in the corresponding category; training the normalization matrix, and outputting
(Continued)

a training value of the normalization matrix when the normalization matrix maximizes a sum of first values of all the user categories.

20 Claims, 6 Drawing Sheets

(51) Int. Cl.
*G10L 17/02* (2013.01)
*G10L 17/00* (2013.01)
*G10L 17/08* (2013.01)

(56) References Cited

U.S. PATENT DOCUMENTS

| | | | |
|---|---|---|---|
| 2015/0127342 A1 | 5/2015 | Sharifi et al. | |
| 2015/0301796 A1* | 10/2015 | Visser | G10L 15/22 715/728 |
| 2016/0042739 A1* | 2/2016 | Cumani | G10L 17/06 704/239 |
| 2018/0005628 A1* | 1/2018 | Xue | G06F 40/20 |
| 2020/0211571 A1* | 7/2020 | Shoa | G10L 17/06 |

FOREIGN PATENT DOCUMENTS

| | | |
|---|---|---|
| CN | 104835498 A | 8/2015 |
| CN | 105139856 A | 12/2015 |
| CN | 105469784 A | 4/2016 |
| CN | 105513597 A | 4/2016 |
| CN | 106297807 A | 1/2017 |

OTHER PUBLICATIONS

Fang, Xin et al., "Discriminative Speaker Models Based on i-Vectors for Speaker Verification", Journal of Chinese Computer Systems, vol. 35, No. 3. Mar. 31, 2014 (Mar. 31, 2014), ISSN:1000-1220, pp. 685-688.
Li, Zhiyi et al., "Total Variability Subspace Adaptation Based Speaker Recognition", Proceedings of the CSU-EPSA, vol. 40, No. 8, Aug. 31, 2014 (Aug. 31, 2014), ISSN:0254-4156, pp. 1836-1840.
Najim, D. et al., "Front-End Factor Analysis for Speaker Verification", IEEE Transactions on Audio, Speech, and Language Processing, vol. 19, No. 4, May 31, 2011 (May 31, 2011), pp. 788-798.
Liu, Tingting et al., "I-vector Based Text-Independent Speaker Identification", Proceeding of the 11th World Congress on Intelligent Control and Automation, Jul. 4, 2014 (Jul. 4, 2014), pp. 5420-5425.
The State Intellectual Property Office of the People's Republic of China (SIPO) Office Action 1 for 201610639606.9 dated Nov. 6, 2018 8 Pages (including translation).
Xiaopeng Chen et al., "Research on time-varying robustness in speaker recognition based on PLDA", "Microcomputer & ItsApplications", vol. 35, No. 5, pp. 58-60, 64.
The European Patent Office (EPO) The Extended European Search Report for 17836440.2 May 7, 2019 8 pages.
Ahmad Waquar et al: "Voice based biometric authentication using collapsing classes discriminative space transform", 2014 IEEE International Symposium on Signal Processing and Information Technology (ISSPIT), IEEE, Dec. 15, 2014, pp. 1-6, XP032795439, DOI: 10.1109/ISSPIT.2014.7300554 [retrieved on Oct. 19, 2015] 6 pages.
Amir Globerson et al: "Metric Learning by Collapsing Classes", Proceedings of the Conference on Neural Information Processing Systems (NIPS 2005), Dec. 5, 2005, pp. 451-458, XP055424737, Retrieved from the Internet: URL: https://papers.nips.cc/paper/2947-metric-learning-by-collapsing-classes.pdf [retrieved on Nov. 14, 2017] 8 pages.

* cited by examiner

| In the first update, that is, when the normalization matrix, the second value, and the first value corresponding to each category are updated, obtain a new normalization matrix by adding up the initial value of the second value and the initialized normalization matrix |—2060

↓

| Update the initialized normalization matrix by using the new normalization matrix, and based on the updated normalization matrix, calculate a new first value corresponding to each category by using the first function corresponding to each category, and calculate a second value by using the derivative function of the third function, thereby completing the first update of the normalization matrix, the first value, and the second value |—2061

↓

| Calculate a variation of the first value corresponding to each category, and perform step 2063 if variations corresponding to each category that are calculated the latest v times are not all less than a first predetermined threshold, where v is a preset number, and v is an integer greater than or equal to 1 |—2062

↓

| In the second update, obtain a new normalization matrix by adding up the second value and the normalization matrix |—2063

↓

| Update the normalization matrix by using the new normalization matrix, and based on the updated normalization matrix, calculate a new first value corresponding to each category by using the first function corresponding to each category, and calculate a second value by using the third function, thereby completing the second update of the normalization matrix, the first value, and the second value |—2064

↓

| Calculate a variation of the first value corresponding to each category, and perform step 2066 if variations corresponding to each category that are calculated the latest v times are not all less than the first predetermined threshold |—2065

↓

| In the $n^{th}$ update, that is, when the normalization matrix, the second value, and the first value corresponding to each category are updated, obtain a new normalization matrix by adding up the second value and the normalization matrix, where n=3, 4… |—2066

↓

| Update the normalization matrix by using the new normalization matrix, and based on the updated normalization matrix, calculate a new first value corresponding to each category by using the first function corresponding to each category, and calculate a second value by using the third function, thereby completing the $n^{th}$ update of the normalization matrix, the first value, and the second value |—2067

↓

| Calculate a variation of the first value corresponding to each category, and go back to perform step 2066 if variations corresponding to each category that are calculated the latest v times are not all less than the first predetermined threshold, where n=n+1, or otherwise, perform step 2069 |—2068

↓

| Determine, from v normalization matrices obtained through the latest v times of addition, a normalization matrix as the normalization matrix maximizing the sum of the first values of the categories |—2069

FIG. 2C

METHOD AND APPARATUS FOR TRAINING VOICEPRINT RECOGNITION SYSTEM

RELATED APPLICATIONS

This application claims priority to PCT Application No. PCT/CN2017/096232, filed on Aug. 7, 2017, which claims priority to Chinese Patent Application No. 201610639606.9, filed with the Chinese Patent Office on Aug. 5, 2016 and entitled "METHOD AND APPARATUS FOR TRAINING VOICEPRINT RECOGNITION SYSTEM." The two applications are incorporated herein by reference in their entirety.

FIELD OF THE TECHNOLOGY

The present disclosure relates to the field of voiceprint recognition technologies, and in particular, to a method and an apparatus for training a voiceprint recognition system.

BACKGROUND OF THE DISCLOSURE

Voiceprint recognition is one of biometric recognition technologies. By processing voice date, an identity vector for indicating identity information of a person inputting the voice can be generated, and by calculating a similarity degree between identity vectors of two voice segments, it can be determined whether persons inputting the two voice segments are the same user.

Voice data are easily affected by channel volatility and environment volatility, resulting in distortion of the identity vector. In a related technology, because spatial distribution of voice segments of a same user is a multi-dimensional Gaussian distribution, identity vectors may be processed by means of linear discriminant analysis (LDA), to compensate for distortion of the identity vectors and improve accuracy of voiceprint recognition.

However, spatial distribution of voice segments of a same user often hardly presents desired multi-dimensional Gaussian distribution. Therefore, voiceprint recognition using an LDA-processed identity vector may not provide much improvement to voiceprint recognition results.

SUMMARY

To resolve the problem of small accuracy improvement in voiceprint recognition using an LDA-processed identity vector in the related technology, embodiments of the present disclosure provide a method and an apparatus for training a voiceprint recognition system. The technical solutions are as follows:

One aspect of the present disclosure provides a method for training a voiceprint recognition system. The method includes obtaining a voice training data set, the voice training data set comprising a plurality of voice segments of a plurality of users; determining identity vectors of all the voice segments in the voice training data set; identifying identity vectors of a plurality of voice segments of a same user in the determined identity vectors; placing the recognized identity vectors of the same user in the plurality of users into one of a plurality of user categories; and determining an identity vector in the user category as a first identity vector. The method further includes normalizing the first identity vector by using a normalization matrix, a first value being a sum of similarity degrees between the first identity vector normalized by using the normalization matrix in the corresponding category and other identity vectors normalized by using the normalization matrix in the corresponding category; training the normalization matrix, and outputting a training value of the normalization matrix when the normalization matrix maximizes a sum of first values of all the user categories.

A second aspect of the present disclosure provides an apparatus for training a voiceprint recognition system, executed by a computer system. The apparatus includes a categorization module, configured to obtain a voice training data set, the voice training data set comprising a plurality of voice segments of a plurality of users; determine identity vectors of all the voice segments in the voice training data set; identify identity vectors of a plurality of voice segments of a same user in the determined identity vectors; and place the recognized identity vectors of the same user in the plurality of users into one of a plurality of user categories. The apparatus further includes a determining module, configured to determine an identity vector in the user category as a first identity vector; normalize the first identity vector by using a normalization matrix, a first value being a sum of similarity degrees between the first identity vector normalized by using the normalization matrix in the corresponding category and the other identity vectors normalized by using the normalization matrix in the corresponding category; and train the normalization matrix, and output a training value of the normalization matrix when the normalization matrix maximizes a sum of first values of all the user categories.

According to a third aspect, a computer readable storage medium is provided, the storage medium storing a computer program, and the computer program, when being executed by a processor, implementing steps of the method according to the first aspect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 2C is a flowchart of determining a normalization matrix maximizing a sum of first values of categories according to another embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Voice data are easily affected by channel volatility and environment volatility, resulting in distortion of an identity vector generated by a voiceprint recognition system for the voice, and lowering recognition accuracy of the voiceprint recognition system. FIGS. 1-4 of the present disclosure provide a method for training a voiceprint recognition system, to train a normalization matrix for the voiceprint recognition system. The voiceprint recognition system can normalize the identity vector by using the trained normalization matrix, to compensate for distortion of the identity vector.

Figure 1:
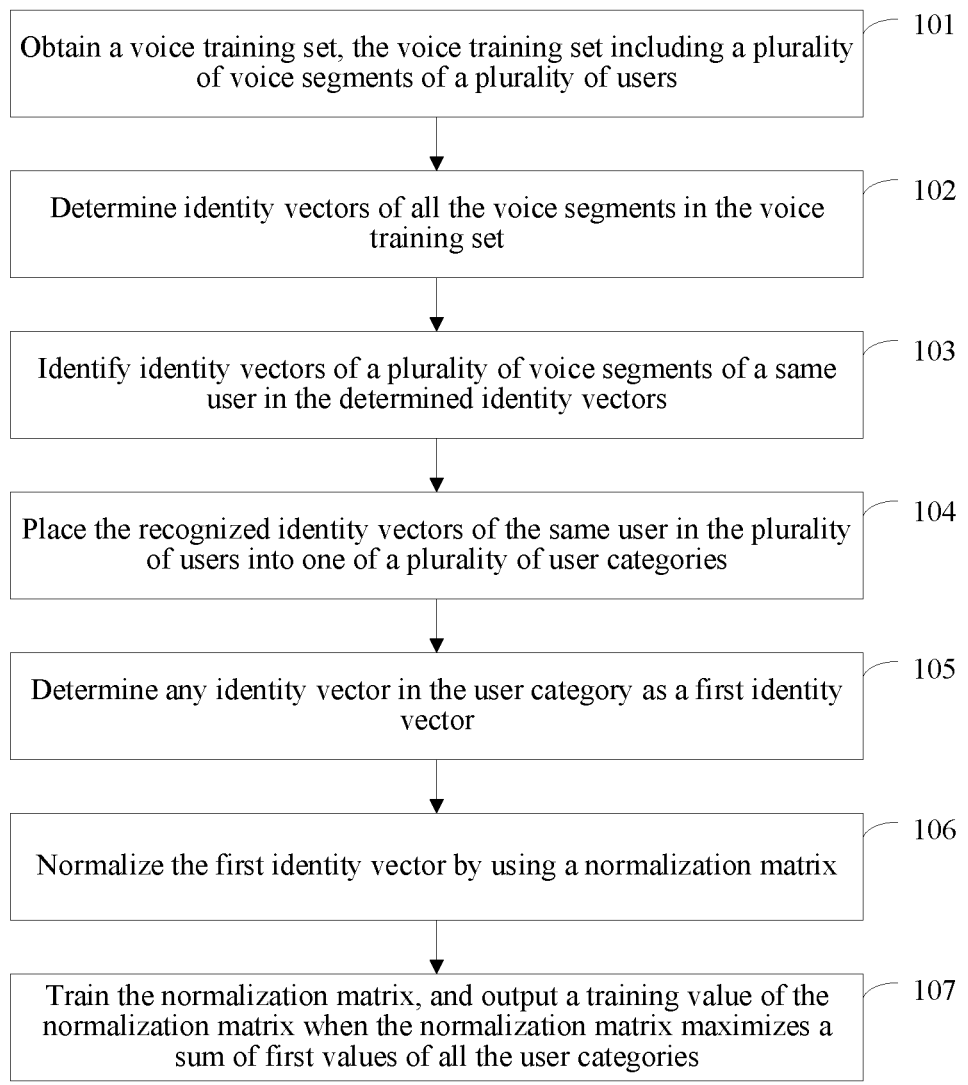
FIG. 1 is a flowchart of a method for training a voiceprint recognition system according to an embodiment of the present disclosure.

FIG. 1 is a flowchart of a method for training a voiceprint recognition system according to an embodiment of the present disclosure. As shown in FIG. 1, the method for training a voiceprint recognition system may include the following steps.

Step 101: Obtain a voice training data set, the voice training data set including a plurality of voice segments of a plurality of users.

Step 102: Determine identity vectors of all the voice segments in the voice training data set.

Step 103: Identify identity vectors of a plurality of voice segments of a same user in the determined identity vectors.

Step 104: Place the recognized identity vectors of the same user in the plurality of users into one of a plurality of user categories.

Step 105: Determine an identity vector in the user category as a first identity vector.

Step 106: Normalize the first identity vector by using a normalization matrix, a first value being a sum of similarity degrees between the first identity vector normalized by using the normalization matrix in the corresponding category and the other identity vectors normalized by using the normalization matrix in the corresponding category.

Step 107: Train the normalization matrix, and output a training value of the normalization matrix when the normalization matrix maximizes a sum of first values of all the user categories.

In embodiments of the present disclosure, the method for training a voiceprint recognition system is provided. The voiceprint recognition system may identity vectors of voice of a same user are placed into a category, a first function for calculating a sum of similarity degrees between a normalized first identity vector in the category and the normalized other identity vector in the category is established, where a function value of the first function is a first value, and a normalization matrix maximizing a sum of first values of categories is determined, thereby completing training of the voiceprint recognition system. Because the determined normalization matrix maximizes the sum of the first values of the user categories, a similarity degree between identity vectors, normalized by using the normalization matrix, of different voice segments of a same user is high. The problem of small accuracy improvement in voiceprint recognition using an LDA-processed identity vector in the related technology is resolved, and accuracy of voiceprint recognition is improved.

Figure 2A:
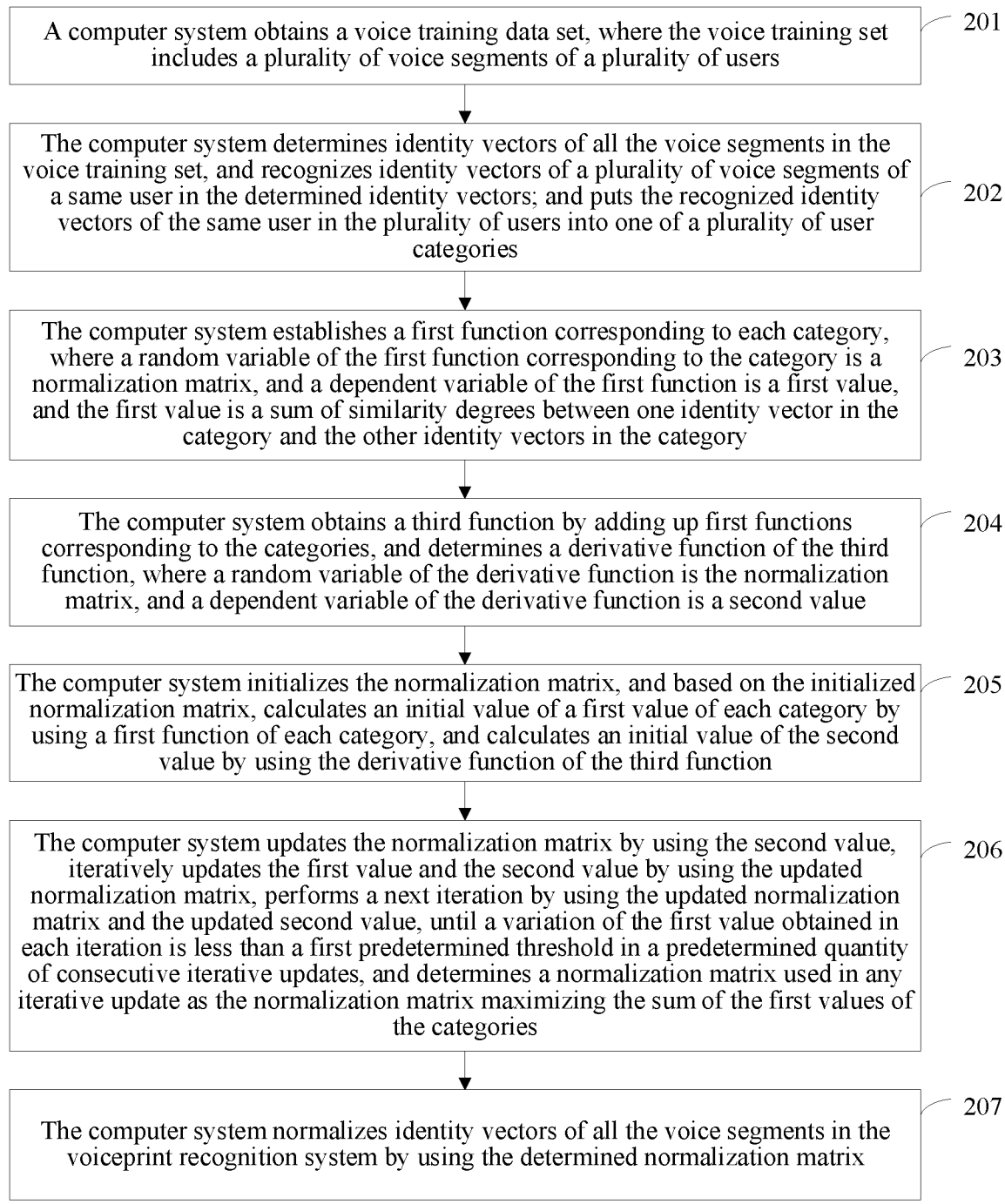
FIG. 2A is a flowchart of a method for training a voiceprint recognition system according to another embodiment of the present disclosure.

FIG. 2A is a flowchart of a method for training a voiceprint recognition system according to another embodiment of the present disclosure. As shown in FIG. 2A, the method for training a voiceprint recognition system may include the following steps.

Step 201: A computer system obtains a voice training data set, where the voice training data set includes a plurality of voice segments of a plurality of users.

Generally, at least two voice segments are recorded or collected for a user, and the recorded or collected voice is added to the voice training data set. The voice training data set includes voice of at least two users.

Step 202: The computer system determines identity vectors of all the voice segments in the voice training data set, and recognizes identity vectors of a plurality of voice segments of a same user in the determined identity vectors; and puts the recognized identity vectors of the same user in the plurality of users into one of a plurality of user categories.

Further, the computer system processes each voice segment in the voice training data set, generates an identity vector for indicating identity information of a person inputting the voice segment, and puts identity vectors of voice of a same user in the voice training data set into a category.

The computer system may extract a feature from voice and generate an identity vector based on the extracted feature in a plurality of manners, which can be implemented by a person of ordinary skill in the art, and are not described in this embodiment.

For example, the voice training data set includes voice of M users. The M users may be represented by a user 1, a user 2 . . . , a user M−1, and a user M. M is an integer greater than or equal to 2. The computer system puts identity vectors corresponding to voice segments of the user 1 into a category 1, and represents a set of the identity vectors in the category 1 by using $C_1$. The computer system puts identity vectors corresponding to voice segments of the user 2 into a category 2, and represents a set of the identity vectors in the category 2 by using $C_2$. The computer system puts identity vectors corresponding to voice segments of the user m into a category m, and represents a set of the identity vectors in the category m by using $C_m$. The other users are derived in the same way, and m=1, 2, 3, 4 . . . M.

Step 203: The computer system establishes a first function corresponding to each category, where a random variable of the first function corresponding to the category is a normalization matrix, and a dependent variable of the first function is a first value, and the first value is a sum of similarity degrees between one identity vector in the category and the other identity vectors in the category.

A similarity degree between two identity vectors is calculated by using the normalization matrix, which may be: normalizing the two identity vectors by using the normalization matrix to obtain two normalized identity vectors, and calculating a similarity degree between the two normalized identity vectors. The calculated similarity degree is the similarity degree between the two identity vectors. It should be noted that, the normalization matrix in this case is an unknown quantity, that is, a random variable.

For each category, the computer system needs to establish a first function for calculating a first value corresponding to the category. For example, for the category 1, the computer system needs to establish a first function for calculating a first value corresponding to the category 1. The first value corresponding to the category 1 is a sum of similarity degrees between a first identity vector in the category 1 and the other identity vectors in the category 1. The first identity vector is an identity vector in the category 1. For another example, for the category 2, the computer system needs to establish a first function for calculating a first value corresponding to the category 2. The first value corresponding to the category 2 is a sum of similarity degrees between a first identity vector in the category 2 and the other identity vectors in the category 2. The first identity vector is an identity vector in the category 2. The other categories are derived in the same way.

Further, when establishing a first function corresponding to a category, the computer system randomly determines one of identity vectors in the category as a first identity vector, and establishes, based on the first identity vector and the other identity vectors in the category, a first function for calculating a first value corresponding to the category, that is, establishes a first function for calculating a sum of similarity degrees between the normalized first identity vector and the normalized other identity vector in the category.

The other identity vectors herein are usually identity vectors in the category that are different from the first identity vector.

For example, identity vectors in the category 1 include $w_1, w_2, \ldots w_6$. When the computer system selects an identity vector $w_3$ from the category 1 as the first identity vector, the other identity vectors herein include the identity vector $w_1$, the identity vector $w_2$, the identity vector $w_4$, the identity vector $w_5$, and the identity vector $w_6$.

Correspondingly, when the first function corresponding to the category 1 is established, the first function for calculating the first value corresponding to the category 1 is established when a random selection result is the identity vector $w_3$. The first value is a sum of a similarity degree between normalized $w_1$ and normalized $w_3$, a similarity degree between normalized $w_2$ and normalized $w_3$, a similarity degree between normalized $w_3$ and normalized $w_4$, a similarity degree between normalized $w_3$ and normalized $w_5$, and a similarity degree between normalized $w_3$ and normalized $w_6$. The normalized $w_1, w_2, \ldots w_6$ are obtained by normalizing $w_1, w_2, \ldots w_6$ by using the normalization matrix.

Figure 2B:
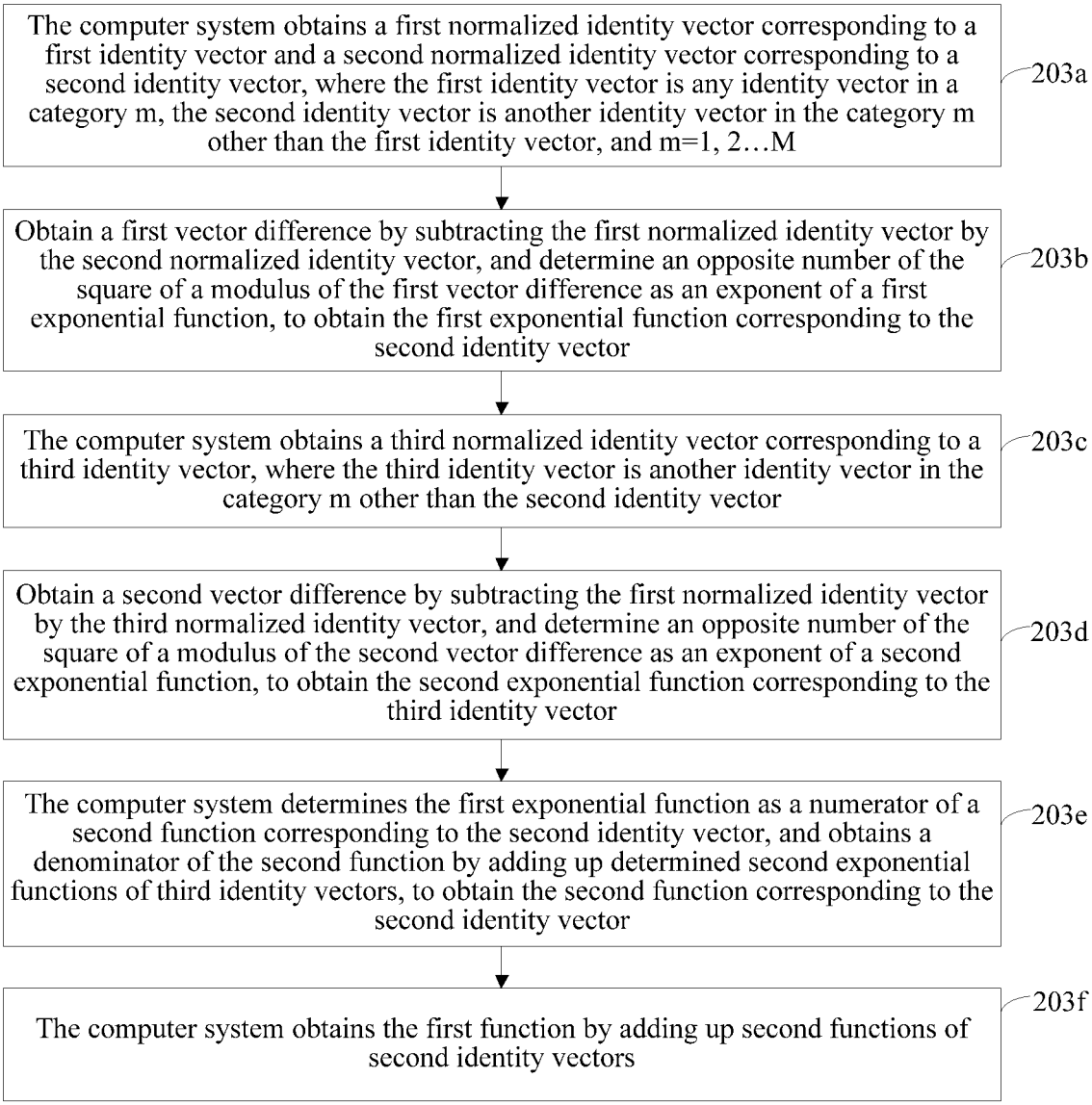
FIG. 2B is a flowchart of establishing a first function according to another embodiment of the present disclosure.

FIG. 2B is a flowchart of establishing a first function according to the present disclosure. In some embodiments, this step may be implemented by substeps shown in FIG. 2B.

Step 203a: For any category m, the computer system obtains a first normalized identity vector corresponding to a first identity vector and a second normalized identity vector corresponding to a second identity vector, where the first identity vector is an identity vector in the category m, the second identity vector is another identity vector in the category m other than the first identity vector, and m=1, 2 ... M.

Specifically, the computer system randomly determines an identity vector from the category m as the first identity vector, determines at least one second identity vector from the other identity vectors in the category m other than the first identity vector, obtains the first normalized identity vector corresponding to the first identity vector by left-multiplying the first identity vector by the normalization matrix, and obtains the second normalized identity vector corresponding to the second identity vector by left-multiplying the second identity vector by the normalization matrix.

The normalization matrix is represented by a matrix A, a set of identity vectors in the category m is represented by $C_m$, the first identity vector in the category m is represented by $w_i$, and the second identity vector in the category m is represented by $w_j$. Then the first identity vector is $w_i \in C_m$, the second identity vector is $w_j \in C_m$, a normalized first identity vector is the first normalized identity vector, and is $Aw_i$, and a normalized second identity vector is the second normalized identity vector, and is $Aw_j$. It is assumed that Cm includes Km identity vectors, Km is an integer greater than or equal to 2, i is any integer from 1 to Km, j is any integer from 1 to Km other than i, and the category m includes Km−1 second identity vectors.

Step 203b: Obtain a first vector difference by subtracting the first normalized identity vector by the second normalized identity vector, and determine an opposite number of the square of a modulus of the first vector difference as an exponent of a first exponential function, to obtain the first exponential function corresponding to the second identity vector.

For example, a first vector difference $Aw_i - Aw_j$ is obtained by subtracting the first normalized identity vector $Aw_i$ by the second normalized identity vector $Aw_j$, and the opposite number of the square of a modulus of the first vector difference $Aw_i - Aw_j$ is $(-\|Aw_i - Aw_j\|^2)$. Then the first exponential function corresponding to the second identity vector $w_j$ is $e^{(-\|Aw_i - Aw_j\|^2)}$.

For example, the identity vector $w_1$ in the category 1 is determined as the second identity vector, and then a first exponential function corresponding to the second identity vector $w_1$ is $e^{(-\|Aw_3 - Aw_1\|^2)}$. For another example, the identity vector $w_2$ in the category 1 is determined as the second identity vector, and then a first exponential function corresponding to the second identity vector $w_2$ is $e^{(-\|Aw_3 - Aw_2\|^2)}$.

Step 203c: The computer system obtains a third normalized identity vector corresponding to a third identity vector, where the third identity vector is another identity vector in the category m other than the second identity vector.

Specifically, the computer system determines an identity vector in the determined identity vectors that is different from the second identity vector as the third identity vector. For each determined third identity vector, the computer system obtains a third normalized identity vector corresponding to the third identity vector by left-multiplying the third identity vector by the normalization matrix.

Step 203d: Obtain a second vector difference by subtracting the first normalized identity vector by the third normalized identity vector, and determine an opposite number of the square of a modulus of the second vector difference as an exponent of a second exponential function, to obtain the second exponential function corresponding to the third identity vector.

The third identity vector herein is an identity vector different from the second identity vector. For example, the category m includes Km voice segments, and Km identity vectors are determined therefrom. When the first identity vector in the category 1 is $w_3$ and the second identity vector in the category 1 is $w_2$, an identity vector in the K identity vectors that is different from the second identity vector $w_2$ is determined as the third identity vector.

When the third identity vector is represented by $w_k$, w is another integer from 1 to Km other than j. A normalized third identity vector, that is, the third normalized identity vector, is $Aw_k$, the second vector difference is $Aw_i - Aw_k$, and the second exponential function corresponding to the third identity vector $w_k$ is $e^{(-\|Aw_i - Aw_j\|^2)}$. For example, the identity vector $w_7$ in the category 2 is determined as the third identity vector, and then the second exponential function corresponding to the third identity vector $w_7$ is $e^{(-\|Aw_3 - Aw_7\|^2)}$. For another example, the identity vector $w_4$ in the category 1 is determined as the third identity vector, and then the second exponential function corresponding to the third identity vector $w_4$ is $e^{(-\|Aw_3 - Aw_4\|^2)}$.

Step 203e: The computer system determines the first exponential function as a numerator of a second function corresponding to the second identity vector, and obtains a denominator of the second function by adding up determined second exponential functions of third identity vectors, to obtain the second function corresponding to the second identity vector.

The second function is a function for calculating a similarity degree between the first normalized identity vector and the second normalized identity vector. The computer system may determine a plurality of second identity vectors from identity vectors in the category that are different from the first identity vector, establish a second function corresponding to each second identity vector. A numerator of the second function corresponding to the second identity vector is a first exponential function corresponding to the second identity vector.

In addition, a denominator of the second function is obtained by adding up determined second exponential functions of third identity vectors. Then the denominator of the second function may be represented by $$\sum_{k \ne j} e^{(-\|Aw_i - Aw_k\|^2)},$$

that is, the denominator of the second function corresponding to each second identity vector may be represented by $$\sum_{k \ne j} e^{(-\|Aw_i - Aw_k\|^2)}.$$

For example, when the second identity vector is $w_1$, the second function corresponding to the second identity vector $w_1$ is $$\frac{e^{(-\|Aw_3 - Aw_1\|^2)}}{\sum_{k \ne j} e^{(-\|Aw_3 - Aw_k\|^2)}}.$$

When the second identity vector is $w_2$, the second function corresponding to the second identity vector $w_2$ is $$\frac{e^{(-\|Aw_3 - Aw_2\|^2)}}{\sum_{k \ne j} e^{(-\|Aw_3 - Aw_k\|^2)}}.$$

When the second identity vector is $w_j$, the second function corresponding to the second identity vector $w_j$ is $$\frac{e^{(-\|Aw_3 - Aw_j\|^2)}}{\sum_{k \ne j} e^{(-\|Aw_j - Aw_k\|^2)}}.$$

The other second identity vectors are derived in the same way.

When the second function is represented by $f_2(A)$, the second function corresponding to each second identity vector $w_j$ in the category m may be represented by $$f_2(A) = P_{ij} = \frac{e^{(-\|Aw_i - Aw_j\|^2)}}{\sum_{k \ne j} e^{(-\|Aw_i - Aw_k\|^2)}},$$

where m=1, 2 ... M. $w_i$ represents the first identity vector in the category m, $w_j$ represents the second identity vector in the category m, $w_k$ represents the third identity vector, and $P_{ij}$ is used to represent the similarity degree between the first identity vector and the second identity vector, that is, the similarity degree between the first normalized identity vector and the second normalized identity vector.

Step 203f: The computer system obtains the first function by adding up second functions of second identity vectors.

The first function is represented by $f_1(A)$, and the set of the identity vectors in the category m is represented by $C_m$. Then the first function of the category m may be represented by $$f_1(A) = \sum_{j \in C_m} P_{ij} = P_i,$$

where $P_i$ is used to represent the first function of the category m.

The random variable of the first function of the category m is the normalization matrix, and the dependent variable of the first function is the first value, that is, $f_1(A)$ is the first value, and the first value $f_1(A)$ is essentially a sum of similarity degrees between the first identity vector and all the second identity vectors. When the first value of the first function is higher, it indicates that an aggregation degree between the identity vectors in the category in a spatial location is higher.

Step 204: The computer system obtains a third function by adding up first functions corresponding to the categories, and determines a derivative function of the third function, where a random variable of the derivative function is the normalization matrix, and a dependent variable of the derivative function is a second value.

The third function is represented by $f_3(A)$, and then a person of ordinary skill in the art may derive the derivative function of the third function by using the first function, which is represented by $$\frac{\partial (f_3(A))}{\partial A} = 2A \left( P_i \sum_k p_i w_{ik} w_{ik}^T - \sum_{j \in C_m} p_{ij} w_{ij} w_{ij}^T \right),$$

where $w_{ik} = w_i - w_k$, and $w_{ij} = w_i - w_j$.

It should be noted that, deriving an expression of the derivative function of the third function by using an expression of the first function can be implemented by a person of ordinary skill in the art, and the deriving process is not described in this embodiment.

Step 205: The computer system initializes the normalization matrix, and based on the initialized normalization matrix, calculates an initial value of a first value of each category by using a first function of each category, and calculates an initial value of the second value by using the derivative function of the third function.

Generally, the normalization matrix is a column matrix, and a row quantity of the normalization matrix is the same as a column quantity of identity vectors.

Further, the computer system initializes the normalization matrix. The computer system determines a first training subset from the identity vectors corresponding to the voice training data set, and calculates the initial value of the first value and the initial value of the second value by using identity vectors in the first training subset and the initialized normalization matrix.

For example, the identity vectors in the first training subset and the initialized normalization matrix $A_0$ are substituted into the first function corresponding to each category, to obtain an initial value $f_{1m}(A_0)$ of the first value of the first function corresponding to each category, where m=1, 2 . . . M, and the initialized normalization matrix $A_0$ is substituted into the derivative function of the third function, to obtain an initial value $$\frac{\partial(f_3(A_0))}{\partial A_0}$$

of the second value of the derivative function.

Step 206: The computer system updates the normalization matrix by using the second value, iteratively updates the first value and the second value by using the updated normalization matrix, performs a next iteration by using the updated normalization matrix and the updated second value, until a variation of the first value obtained in each iteration is less than a first predetermined threshold in a predetermined quantity of consecutive iterative updates, and determines a normalization matrix used in any iterative update as the normalization matrix maximizing the sum of the first values of the categories.

In some embodiments, the computer system obtains an updated normalization matrix by adding up an updated normalization matrix in a previous iterative update process and an updated second value in the previous iterative update process.

In some embodiments, the computer system obtains an updated normalization matrix in a current iteration by adding up the updated normalization matrix in the previous iterative update process and the product of multiplying the updated second value in the previous iterative update process by a predetermined coefficient. The predetermined coefficient herein is usually a value set by a system developer, for controlling an adjustment amplitude of the normalization matrix.

FIG. 2C is a flowchart of determining a normalization matrix maximizing a sum of first values of categories according to the present disclosure. In some embodiments, this step may be implemented by substeps shown in FIG. 2C.

Step 2060: In the first update, that is, when the normalization matrix $A_0$, the second value $$\frac{\partial(f_3(A_0))}{\partial A_0},$$

and the first value $f_{1m}(A_0)$ corresponding to each category are updated, obtain a new normalization matrix $A_1$ by adding up the initial value $$\frac{\partial(f_3(A_0))}{\partial A_0}$$

of the second value and the initialized normalization matrix $A_0$.

Step 2061: Update the initialized normalization matrix $A_0$ by using the new normalization matrix $A_1$, and based on the updated normalization matrix $A_1$, calculate a new first value $f_{1m}(A_1)$ corresponding to each category by using the first function corresponding to each category, and calculate a second value $$\frac{\partial(f_3(A_1))}{\partial A_1}$$

by using the derivative function of the third function, thereby completing the first update of the normalization matrix, the first value, and the second value.

M new first values calculated in this step are $f_{11}(A_1)$, $f_{12}(A_1)$ . . . $f_{1M}(A_1)$.

Step 2062: Calculate a variation $f_{1m}(A_1)\_f_{1m}(A_0)$ of the first value corresponding to each category, and perform step 2063 if variations corresponding to each category that are calculated the latest v times are not all less than a first predetermined threshold, where v is a preset number, and v is an integer greater than or equal to 1.

Step 2063: In the second update, that is, when the normalization matrix $A_1$, the second value $$\frac{\partial(f_3(A_1))}{\partial A_1},$$

and the first value $f_{1m}(A_1)$ corresponding to each category are updated, obtain a new normalization matrix $A_2$ by adding up the second value $$\frac{\partial(f_3(A_1))}{\partial A_1}$$

and the normalization matrix $A_1$.

Step 2064: Update the normalization matrix $A_1$ by using the new normalization matrix $A_2$, and based on the updated normalization matrix $A_2$, calculate a new first value $f_{1m}(A_2)$ corresponding to each category by using the first function corresponding to each category, and calculate a second value $$\frac{\partial(f_3(A_2))}{\partial A_2}$$

by using the third function, thereby completing the second update of the normalization matrix, the first value, and the second value.

M new first values calculated in this step are $f_{11}(A_2)$, $f_{12}(A_2)$ . . . $f_{1M}(A_2)$.

Step 2065: Calculate a variation $f_{1m}(A_2)\_f_{1m}(A_1)$ of the first value corresponding to each category, and perform step 2066 if variations corresponding to each category that are calculated the latest v times are not all less than the first predetermined threshold.

Step 2066: In the $n^{th}$ update, that is, when the normalization matrix $A_{n-1}$, the second value $$\frac{\partial(f_3(A_{n-1}))}{\partial A_{n-1}},$$

and the first value $f_1(A_{n-1})$ corresponding to each category are updated, obtain a new normalization matrix $A_n$ by adding up the second value $$\frac{\partial(f_3(A_{n-1}))}{\partial A_{n-1}}$$

and the normalization matrix $A_{n-1}$, where n=3, 4 . . . .

Step 2067: Update the normalization matrix $A_{n-1}$ by using the new normalization matrix $A_n$, and based on the updated normalization matrix $A_n$, calculate a new first value $f_{1m}(A_n)$ corresponding to each category by using the first function corresponding to each category, and calculate a second value $$\frac{\partial(f_3(A_n))}{\partial A_n}$$

by using the third function, thereby completing the $n^{th}$ update of the normalization matrix, the first value, and the second value.

M new first values calculated in this step are $f_{11}(A_n)$, $f_{12}(A)$ . . . $f_{1M}(A_n)$.

The computer system calculates the first value obtained after the $(n-1)^{th}$ update and the second value obtained after the $(n-1)^{th}$ update by using an $n^{th}$ training subset in the determined identity vectors and the normalization matrix obtained after the $(n-1)^{th}$ update, where n≥3.

Step 2068: Calculate a variation $f_{1m}(A_n)\_f_{1m}(A_n)$ of the first value corresponding to each category, and go back to perform step 2066 if variations corresponding to each category that are calculated the latest v times are not all less than the first predetermined threshold, where n=n+1, or otherwise, perform step 2069.

Step 2069: Determine, from v normalization matrices $A_{n-v+1}, A_{n-v+2} \ldots A_n$ obtained through the latest v times of addition, a normalization matrix as the normalization matrix maximizing the sum of the first values of the categories.

When n=3, n−3 updates refer to initialization of the computer system.

For example, after the first value is initialized and the second value is initialized, the normalization matrix $A_2$ obtained after the first update is obtained by adding up the initial value $$\frac{\partial(f_3(A_1))}{\partial A}$$

of the second value and the initialized matrix $A_1$. A second training subset is determined from the identity vectors corresponding to the voice training data set. Identity vectors in the second training subset are not completely the same as the identity vectors in the first training subset. The first value is calculated by using the identity vectors in the second training subset and the normalization matrix $A_2$ obtained after the first update to obtain the first value $f_3(A_2)$ obtained after the first update, and the second value is calculated by using the identity vectors in the second training subset and the normalization matrix $A_2$ obtained after the first update to obtain the second value $$\frac{\partial(f_3(A_2))}{\partial A}$$

obtained after the first update.

For another example, the normalization matrix $A_n$ obtained after the $(n-1)^{th}$ update is obtained by adding up the second value $$\frac{\partial(f_3(A_{n-1}))}{\partial A}$$

obtained in the $(n-2)^{th}$ update and $A_{n-1}$ obtained after the $(n-2)^{th}$ update. A $n^{th}$ training subset is determined from the identity vector corresponding to the voice training data set. Identity vectors in the $n^{th}$ training subset are not completely the same as identity vectors in any one of the previous n−1 training subsets. The first value $f_3(A_n)$ obtained after the $(n-1)^{th}$ update and the second value $$\frac{\partial(f_3(A_n))}{\partial A}$$

obtained after the $(n-1)^{th}$ update are calculated by using the identity vectors in the $n^{th}$ training subset and the normalization matrix $A_n$ obtained after the $(n-1)^{th}$ update.

In addition, in each iterative update, a difference between the first value obtained after the update and the first value before the update is calculated. When a variation of the first value obtained in each iteration is less than the first predetermined threshold in a predetermined quantity of consecutive iterative updates, it is considered that the sum (that is, the value of the third function) of the first values is maximized in the predetermined quantity of consecutive iterative updates. In this case, a normalization matrix used in any one of the iterative updates may be determined as the normalization matrix maximizing the sum of the first values of the categories.

Generally, a specific value of the predetermined quantity and the first predetermined threshold are set by a system developer. When a variation of the first value obtained in any iteration is greater than the first predetermined threshold in the predetermined quantity of consecutive iterative updates, the current iteration update is performed by using a normalization matrix and a second value that are obtained in the previous iterative update.

Step 207: The computer system normalizes identity vectors of all the voice segments in the voiceprint recognition system by using the determined normalization matrix.

In step 201 to step 206, training of the voiceprint recognition system is completed, and the normalization matrix used by the voiceprint recognition system to normalize an identity vector in an embodiment is determined. In actual use, the identity vector of each voice segment is normalized by left-multiplying the identity vector by the determined normalization matrix.

It should be noted that, in this embodiment, when the first function is established, a neighborhood components analysis (NCA) algorithm is used, the difference between the normalized first identity vector and the normalized second identity vector is calculated by using the first exponential function, the difference between the normalized first identity vector and the normalized third identity vector is calculated by using the second exponential function, the similarity degree between the first identity vector and the second identity vector is represented by the second function, and the sum of the similarity degrees between the first identity vector and the other identity vectors in the category is represented by the first function.

Experimental data shows that, using an equal error rate (EER) as a measurement indicator, the EER is 5.48% when the voiceprint recognition system performs recognition by using an unnormalized identity vector; the EER may decrease to 5.37% when the voiceprint recognition system normalizes the identity vector by means of LDA; the EER may decrease to 5.19% when the voiceprint recognition system normalizes the identity vector by means of NDA; the EER may decrease to 4.9% when the voiceprint recognition system normalizes the identity vector by using a normalization matrix determined by means of NCA.

In conclusion, in the method for training a voiceprint recognition system provided in this embodiment, identity vectors of voice of a same user are placed into a category, a first function for calculating a sum of similarity degrees between a normalized first identity vector in the category and the normalized other identity vector in the category is established, where a function value of the first function is a first value, and a normalization matrix maximizing a sum of first values of categories is determined, thereby completing training of the voiceprint recognition system. Because the determined normalization matrix maximizes the sum of the first values of the user categories, a similarity degree between identity vectors, normalized by using the normalization matrix, of different voice segments of a same user is high. The problem of small accuracy improvement in voiceprint recognition using an LDA-processed identity vector in the related technology is resolved, and accuracy of voiceprint recognition is improved.

Figure 2D:
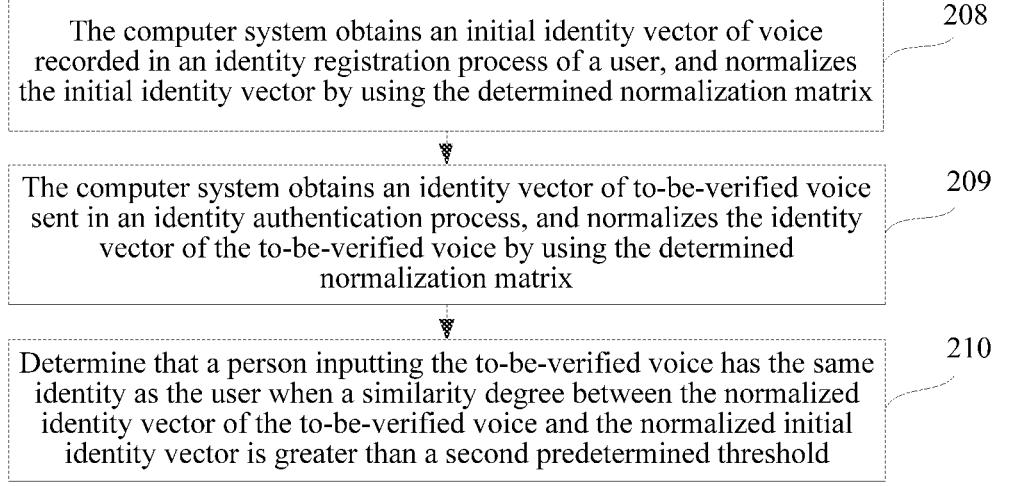
FIG. 2D is a flowchart of identifying the identity of a person inputting voice by using a voiceprint recognition system according to another embodiment of the present disclosure.

In addition, after training of the voiceprint recognition system is completed, a person inputting voice may be identified by using the voiceprint recognition system, which may be implemented by steps shown in FIG. 2D. FIG. 2D is a flowchart of identifying a person inputting voice by using a voiceprint recognition system according to the present disclosure.

Step 208: The computer system obtains an initial identity vector of voice recorded in an identity registration process of a user, and normalizes the initial identity vector by using the determined normalization matrix.

Figure 2E:
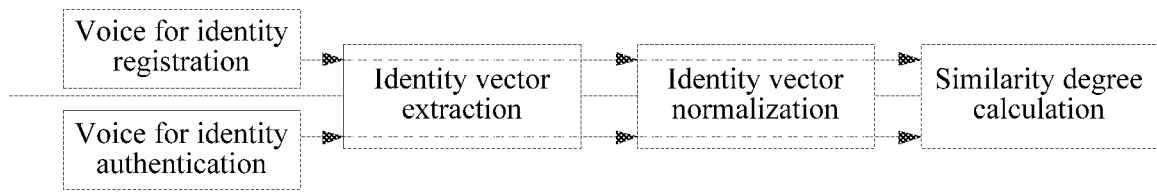
FIG. 2E is a schematic diagram of a use phase of a voiceprint recognition system according to another embodiment of the present disclosure.

FIG. 2E is a schematic diagram of a use phase of a voiceprint recognition system according to the present disclosure. As shown in FIG. 2E, use of the voiceprint recognition system includes an identity registration phase and an identity authentication phase.

Generally, when a user uses the voiceprint recognition system the first time, the user needs to perform identity registration in the voiceprint recognition system.

When the user performs identity registration, the voiceprint recognition system is in an identity registration phase. The voiceprint recognition system obtains voice for identity registration, processes the voice to generate an identity vector of the voice, and determines the identity vector of the voice as an initial identity vector of the user. The voiceprint recognition system normalizes the initial identity vector by left-multiplying the initial identity vector by the determined normalization matrix, and stores the normalized initial identity vector, thereby completing identity registration.

Step 209: The computer system obtains an identity vector of to-be-verified voice sent in an identity authentication process, and normalizes the identity vector of the to-be-verified voice by using the determined normalization matrix.

When the user performs identity authentication, the voiceprint recognition system is in an identity authentication phase. The voiceprint recognition system obtains the to-be-verified voice for identity authentication, and determines the identity vector of the to-be-verified voice. The voiceprint recognition system normalizes the identity vector of the to-be-verified voice by left-multiplying the identity vector of the to-be-verified voice by the normalization matrix.

Step 210: Determine that a person inputting the to-be-verified voice has the same identity as the user when a similarity degree between the normalized identity vector of the to-be-verified voice and the normalized initial identity vector is greater than a second predetermined threshold.

Generally, the second predetermined threshold is usually set by a system developer. In addition, calculating the similarity degree between the normalized identity vector of the to-be-verified voice and the normalized initial identity vector can be implemented by a person of ordinary skill in the art, and is not described this embodiment.

The voiceprint recognition system may determine that the person inputting the to-be-verified voice has the same identity as the user when the similarity degree between the normalized identity vector of the to-be-verified voice and the normalized initial identity vector is greater than the second predetermined threshold.

The voiceprint recognition system may determine that the person inputting the to-be-verified voice has a different identity than the user when the similarity degree between the normalized identity vector of the to-be-verified voice and the normalized initial identity vector is less than the second predetermined threshold.

In one embodiment of the voiceprint recognition system, identity authentication on the person inputting the to-be-verified voice is implemented by determining whether the similarity degree between the identity vector of the normalized to-be-verified voice and the normalized initial identity vector is greater than the second predetermined threshold.

Figure 3:
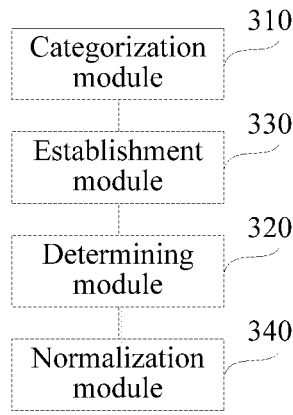
FIG. 3 is a block diagram of an apparatus for training a voiceprint recognition system according to an embodiment of the present disclosure.

FIG. 3 is a block diagram of an apparatus for training a voiceprint recognition system according to an embodiment of the present disclosure. As shown in FIG. 3, the apparatus for training a voiceprint recognition system includes: a categorization module 310 and a determining module 320.

The categorization module 310 is configured to obtain a voice training data set, the voice training data set including a plurality of voice segments of a plurality of users; determine identity vectors of all the voice segments in the voice training data set; identify identity vectors of a plurality of voice segments of a same user in the determined identity vectors; and place the recognized identity vectors of the same user in the plurality of users into one of a plurality of user categories.

The determining module 320 is configured to determine an identity vector in the user category as a first identity vector; normalize the first identity vector by using a normalization matrix, a first value being a sum of similarity degrees between the first identity vector normalized by using the normalization matrix in the corresponding category and the other identity vectors normalized by using the normalization matrix in the corresponding category; and train the normalization matrix, and output a training value of the normalization matrix when the normalization matrix maximizes a sum of first values of all the user categories.

In one embodiment, the apparatus further includes: an establishment module 330, configured to establish a first function for determining a first value corresponding to each user category, where the normalization matrix is a random variable of the first function.

In one embodiment, the establishment module 330 includes: a first establishing unit, configured to establish a first exponential function corresponding to a second identity vector, where the second identity vector is another identity vector in the category other than the first identity vector, an exponent of the first exponential function is an opposite number of the square of a modulus of a first vector difference, and the first vector difference is obtained by subtracting the first identity vector normalized by using the normalization matrix by the second identity vector normalized by using the normalization matrix.

The establishment module 330 may further include: a second establishing unit, configured to establish a second exponential function corresponding to a third identity vector, where the third identity vector is another identity vector in the category other than the second identity vector, an exponent of the second exponential function is an opposite number of the square of a modulus of a second vector difference, and the second vector difference is obtained by subtracting the first identity vector normalized by using the normalization matrix by the third identity vector normalized by using the normalization matrix; and a third establishing unit, configured to establish the first function corresponding to the category based on the first exponential function corresponding to the second identity vector and the second exponential function corresponding to the third identity vector.

In one embodiment, the third establishing unit is configured to: obtain a denominator of a second function by adding up second exponential functions corresponding to all third identity vectors; use a first exponential function corresponding to each second identity vector as a numerator of the second function, and establish a second function corresponding to each second identity vector; and obtain the first function corresponding to the category by adding up second functions of all the second identity vectors.

In one embodiment, the establishment module 330 includes: a first determining unit, a second determining unit, a third determining unit, a fourth determining unit, and a fifth determining unit.

The first determining unit may be configured to determine, for each category, at least one second identity vector from the other identity vectors in the category, obtain a first vector difference by subtracting the normalized first identity vector in the category by a normalized second identity vector in the category, and determine an opposite number of the square of a modulus of the first vector difference as an exponent of the first exponential function.

The second determining unit may be configured to determine the first exponential function determined by the first determining unit as a numerator of a second function corresponding to the second identity vector, where the second function is a function for calculating a similarity degree between the normalized first identity vector and the normalized second identity vector.

The third determining unit may be configured to determine an identity vector in the determined identity vectors that is different from the second identity vector as a third identity vector.

The fourth determining unit is configured to: for each third identity vector determined by the third determining unit, subtract the normalized first identity vector in the category by a normalized third identity vector to obtain a second vector difference, and determine an opposite number of the square of a modulus of the second vector difference as an exponent of a second exponential function.

The fifth determining unit is configured to obtain a denominator of the second function by adding up determined second exponential functions corresponding to third identity vectors, and obtain the first function by adding up second functions corresponding to second identity vectors.

In one embodiment, the determining module 320 includes: a first determining unit, configured to obtain a third function by adding up first functions corresponding to all the categories, and determine a derivative function of the third function, where a random variable of the derivative function is the normalization matrix, and a dependent variable of the derivative function is a second value.

The determining module 320 may further include a calculation unit, configured to initialize the normalization matrix, and based on the initialized normalization matrix, calculate an initial value of a first value of each category by using a first function of each category, and calculate an initial value of the second value by using the derivative function; and a second determining unit, configured to determine, based on the initialized normalization matrix, the initial value of the second value, and the initial value of the first value of each category, the normalization matrix maximizing the sum of the first values of all the user categories.

In one embodiment, the second determining unit is configured to: obtain a new normalization matrix $$\frac{\partial(f_3(A_{n-1}))}{\partial A_{n-1}}$$

by adding up a second value $A_{n-1}$ and a normalization matrix $A_n$, where n=1, 2 ..., $A_0$ is the initialized normalization matrix, and $$\frac{\partial(f_3(A_0))}{\partial A_0}$$

is the initial value of the second value.

The second determining unit is further configured to: based on $A_n$, calculate a new first value $f_{1m}(A_n)$ corresponding to each category by using the first function of each category, and calculate a second value $$\frac{\partial(f_3(A_n))}{\partial A_n}$$

by using the third function, where m=1, 2 ... M, M is a total quantity of the categories, and $f_{1m}(A_0)$ is the initial value of the first value; and calculate a variation $f_{1m}(A_n)$_$f_{1m}(A_{n-1})$ of the first value corresponding to each category, and determine, from normalization matrices obtained through the latest v times of addition, a normalization matrix if variations corresponding to each category that are calculated the latest v times are not all less than a first predetermined threshold, where v is a predetermined number.

In one embodiment, the determining module 320 includes: a sixth determining unit, an initialization unit, and an update unit.

The sixth determining unit is configured to obtain a third function by adding up first functions corresponding to categories, determine a derivative function of the third function, and determine a value of the derivative function as a second value.

The initialization unit is configured to initialize the normalization matrix, and calculate an initial value of the first value and an initial value of the second value by using the initialized normalization matrix.

The update unit is configured to update the normalization matrix by using the second value, iteratively update the first value and the second value by using the updated normalization matrix, perform a next iteration by using the updated normalization matrix and the updated second value, until a variation of the first value obtained in each iteration is less than a first predetermined threshold in a predetermined quantity of consecutive iterative updates, and determine a normalization matrix used in any iterative update as the normalization matrix maximizing the sum of the first values of the categories.

In one embodiment, the initialization unit is further configured to calculate the initial value of the first value and the initial value of the second value by using a first training subset in the identity vectors determined by the categorization module and the initialized normalization matrix.

In one embodiment, the update unit includes: a first update subunit and a second update subunit.

The first update subunit is configured to update the normalization matrix by using the second value obtained in the $(n-2)^{th}$ update to obtain the normalization matrix obtained after the $(n-1)^{th}$ update.

The second update subunit is configured to calculate the first value obtained after the $(n-1)^{th}$ update and the second value obtained after the $(n-1)^{th}$ update by using an $n^{th}$ training subset in the identity vectors determined by the categorization module and the normalization matrix obtained after the $(n-1)^{th}$ update, where n≥2.

In one embodiment, referring to FIG. 3, the apparatus for training a voiceprint recognition system further includes: a normalization module 340, configured to normalize, by using the normalization matrix determined by the determining module 330, an identity vector of voice obtained in the voiceprint recognition system.

In one embodiment, the normalization module 340 further includes: a first normalization unit and a second normalization unit.

The first normalization unit is configured to obtain an initial identity vector of voice recorded in an identity registration process of a user, and normalize the initial identity vector by using the normalization matrix determined by the determining module.

The second normalization unit is configured to obtain an identity vector of to-be-verified voice sent in an identity authentication process, and normalize the identity vector of the to-be-verified voice by using the normalization matrix determined by the determining module.

The apparatus for training a voiceprint recognition system further includes: a determination module, configured to determine that a person inputting the to-be-verified voice has the same identity as the user when a similarity degree between the normalized identity vector of the to-be-verified voice and the normalized initial identity vector is greater than a second predetermined threshold.

In summary, in the apparatus for training a voiceprint recognition system provided in this embodiment, identity vectors of voice of a same user are put into a category, a first function for calculating a sum of similarity degrees between a normalized first identity vector in the category and the normalized other identity vector in the category is established, where a function value of the first function is a first value, and a normalization matrix maximizing a sum of first values of categories is determined, thereby completing training of the voiceprint recognition system. Because the determined normalization matrix maximizes the sum of the first values of the user categories, a similarity degree between identity vectors, normalized by using the normalization matrix, of different voice segments of a same user is high. The problem of small accuracy improvement in voiceprint recognition using an LDA-processed identity vector in the related technology is resolved, and accuracy of voiceprint recognition is improved.

It should be noted that, the foregoing function modules or functional units are only divided for exemplary description purposes when the apparatus for training a voiceprint recognition system provided in the foregoing embodiment trains the voiceprint recognition system. In some embodiments, the foregoing function may be allocated to and completed by different function modules according to specific needs, which means that the internal structure of the apparatus may be divided to different functional modules or functional units to complete all or some of the foregoing described functions. In addition, the apparatus for training a voiceprint recognition system provided in the foregoing embodiment and the embodiments of the method for training a voiceprint recognition system belong to the same conception, and the specific implementation process is described in the method embodiments in detail, which is not described here again.

In the present disclosure, a functional module or a functional unit may refer to one or more computer programs stored in one or more computer readable media. When executed by a processor, the computer programs may implement the corresponding functions of the functional module or functional unit. Further, a functional module or a functional unit may include a hardware component and one or more computer programs stored in one or more computer readable media. When executed by a processor, the hardware component and the computer programs may implement the corresponding functions of the functional module or functional unit.

Figure 4:
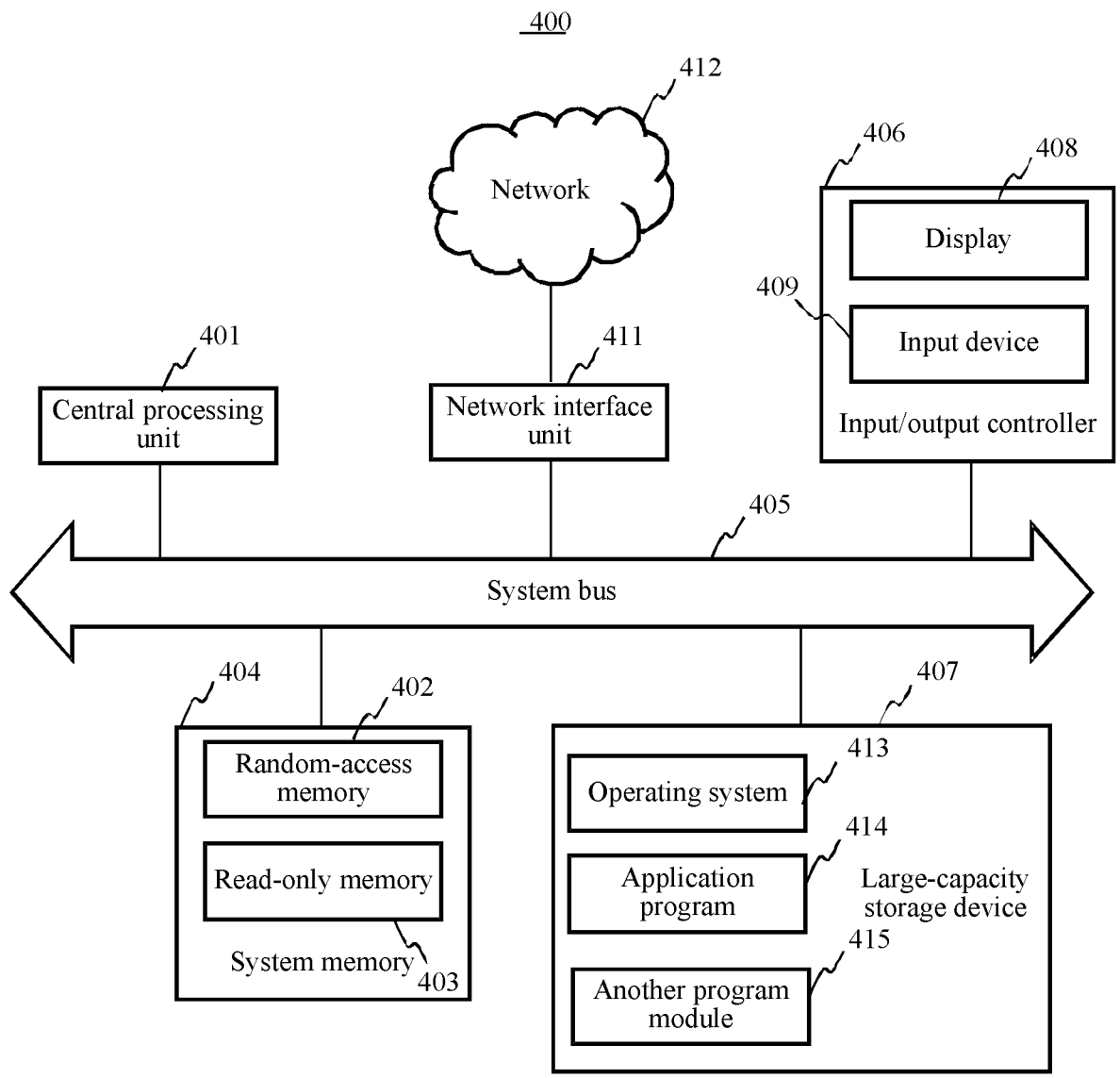
FIG. 4 is a schematic structural diagram of a voiceprint recognition system according to an embodiment of the present disclosure.

FIG. 4 is a schematic structural diagram of a voiceprint recognition system according to an embodiment of the present disclosure.

As shown in FIG. 4, the server 400 includes a central processing unit (CPU) 401, a system memory 404 including a random-access memory (RAM) 402 and a read-only memory (ROM) 403, and a system bus 405 connecting the system memory 404 and the CPU 401. The server 400 further includes a basic input/output (I/O) system 406 that helps information transmission between components in a computer, and a large-capacity storage device 407 for storing an operating system 413, an application program 414, and another program module 415.

The basic I/O system 406 includes a display 408 for displaying information and an input device 409, such as a mouse or a keyboard, for a user to input information. The display 408 and the input device 409 both connect to the CPU 401 by using an I/O controller 410 connected to the system bus 405. The basic I/O system 406 may further include the I/O controller 410 to receive and process input from a plurality of other devices such as a keyboard, a mouse, and an electronic stylus. Similarly, the I/O controller 410 further provides output to a screen, a printer, or an output device of another type.

The large-capacity storage device 407 is connected to the CPU 401 by using a large-capacity storage controller (not shown) connected to the system bus 405. The large-capacity storage device 407 and an associated computer readable medium provide non-volatile storage for the server 400.

That is, the large-capacity storage device 407 may include a computer readable medium (not shown) such as a hard disk or a CD-ROM drive.

Without loss of generality, the computer readable medium may include a computer storage medium and a communications medium. The computer storage medium includes a volatile, non-volatile, movable, or unmovable medium that is implemented by using any method or technology, and configured to store information such as a computer readable instruction, a data structure, a program module, or other data. The computer storage medium includes a static random access memory (SRAM), an electrically erasable programmable read-only memory (EEPROM), an erasable programmable read-only memory (EPROM), a programmable read-only memory (PROM), a RAM, a ROM, a flash memory or another solid-state memory technology, a CD-ROM, a digital versatile disc (DVD) or another optical storage, a cassette, a magnetic tape, a magnetic disk storage or another magnetic storage device. Certainly, a person skilled in the art may know that the computer storage medium is not limited to above. The system memory 404 and the large-capacity storage device 407 may be collectively referred to as a memory.

According to the embodiments of the present disclosure, the server 400 may also run by connecting to a remote computer in a network through the Internet or other networks. That is, the server 400 may be connected to a network 405 by using a network interface unit 411 of the system bus 412, or connected to a network of another type or a remote computer system (not shown) by using the network interface unit 411.

The memory further includes one or more programs. The one or more programs are configured to be executed by one or more processors, and include instructions for performing the following operations: determining identity vectors of all voice segments in a voice training data set, and placing identity vectors of voice of a same user in the determined identity vectors into a category; establishing a first function for calculating a first value corresponding to each category, where the first value is a sum of similarity degrees between a first identity vector normalized by using a normalization matrix in the corresponding category and the other identity vectors normalized by using the normalization matrix in the corresponding category, a random variable of the first function is the normalization matrix, and the normalization matrix is used to left-multiply an identity vector to normalize the identity vector; determining a normalization matrix maximizing a sum of first values of all the categories; and normalizing, by using the determined normalization matrix, an identity vector of voice obtained in the voiceprint recognition system.

In some embodiments, the one or more programs further include instructions for performing the following operations: establishing a first exponential function corresponding to a second identity vector, where the second identity vector is another identity vector in the category other than the first identity vector, an exponent of the first exponential function is an opposite number of the square of a modulus of a first vector difference, and the first vector difference is obtained by subtracting the first identity vector normalized by using the normalization matrix by the second identity vector normalized by using the normalization matrix; establishing a second exponential function corresponding to a third identity vector, where the third identity vector is another identity vector in the category other than the second identity vector, an exponent of the second exponential function is an opposite number of the square of a modulus of a second vector difference, and the second vector difference is obtained by subtracting the first identity vector normalized by using the normalization matrix by the third identity vector normalized by using the normalization matrix; and establishing the first function corresponding to the category based on the first exponential function corresponding to the second identity vector and the second exponential function corresponding to the third identity vector.

In some embodiments, the one or more programs further include instructions for performing the following operations: obtaining a denominator of a second function by adding up second exponential functions corresponding to all third identity vectors; using a first exponential function corresponding to each second identity vector as a numerator of the second function, and establishing a second function corresponding to each second identity vector; and obtaining the first function corresponding to the category by adding up second functions of all the second identity vectors.

In some embodiments, the one or more programs further include instructions for performing the following operations: determining, for each category, at least one second identity vector from the other identity vectors in the category, obtaining a first vector difference by subtracting the normalized first identity vector in the category by a normalized second identity vector in the category, and determining an opposite number of the square of a modulus of the first vector difference as an exponent of the first exponential function; determining the first exponential function as a numerator of the second function corresponding to the second identity vector, where the second function is a function for calculating a similarity degree between the normalized first identity vector and the normalized second identity vector; determining an identity vector in the determined identity vectors that is different from the second identity vector as a third identity vector. The operations may further include for each third identity vector, obtaining a second vector difference by subtracting the normalized first identity vector by a normalized third identity vector, and determining an opposite number of the square of a modulus of the second vector difference as an exponent of a second exponential function; and obtaining a denominator of the second function by adding up determined second exponential functions corresponding to third identity vectors, and obtaining the first function by adding up second functions corresponding to second identity vectors.

In some embodiments, the one or more programs further include instructions for performing the following operations: obtaining a third function by adding up first functions corresponding to all the categories, and determining a derivative function of the third function, where a random variable of the derivative function is the normalization matrix, and a dependent variable of the derivative function is a second value; and initializing the normalization matrix. The operations may further include based on the initialized normalization matrix, calculating an initial value of a first value of each category by using a first function of each category, and calculating an initial value of the second value by using the derivative function; and determining, based on the initialized normalization matrix, the initial value of the second value, and the initial value of the first value of each category, the normalization matrix maximizing the sum of the first values of all the user categories.

In some embodiments, the one or more programs further include instructions for performing the following operations: obtaining a new normalization matrix $$\frac{\partial(f_3(A_{n-1}))}{\partial A_{n-1}}$$

by adding up a second value $A_{n-1}$ and a normalization matrix $A_n$, where n=1, 2 . . . , $A_0$ is the initialized normalization matrix, and $$\frac{\partial(f_3(A_0))}{\partial A_0}$$

is the initial value of the second value.

Further, the operations may include: based on $f_{1m}(A_n)$, calculating a new first value $A_n$ corresponding to each category by using the first function of each category, and calculating a second value $$\frac{\partial(f_3(A_n))}{\partial A_n}$$

by using the third function, where m=1, 2 . . . M, M is a total quantity of the categories, and $f_{1m}(A_0)$ is the initial value of the first value.

Further, the operations may include: calculating a variation $f_{1m}(A_n)\_f_{1m}(A_{n-1})$ of the first value corresponding to each category, and determining, from normalization matrices obtained through the latest v times of addition, a normalization matrix if variations corresponding to each category that are calculated the latest v times are not all less than a first predetermined threshold, where v is a predetermined number.

In some embodiments, the one or more programs further include instructions for performing the following operations: obtaining a third function by adding up first functions corresponding to the categories, determining a derivative function of the third function, and determining a value of the derivative function as a second value; initializing the normalization matrix, and calculating an initial value of the first value and an initial value of the second value by using the initialized normalization matrix; and updating the normalization matrix by using the second value, iteratively updating the first value and the second value by using the updated normalization matrix, performing a next iteration by using the updated normalization matrix and the updated second value, until a variation of the first value obtained in each iteration is less than a first predetermined threshold in a predetermined quantity of consecutive iterative updates, and determining a normalization matrix used in any iterative update as the normalization matrix maximizing the sum of the first values of the categories.

In some embodiments, the one or more programs further include an instruction for performing the following operation: calculating the initial value of the first value and the initial value of the second value by using a first training subset in the determined identity vectors and the initialized normalization matrix.

In some embodiments, the one or more programs further include instructions for performing the following operations: updating the normalization matrix by using the second value obtained in the $(n-2)^{th}$ update, to obtain the normalization matrix obtained after the $(n-1)^{th}$ update; and calculating the first obtained after the $(n-1)^{th}$ update and the second obtained after the $(n-1)^{th}$ update by using a $n^{th}$ training subset in the determined identity vectors and the normalization matrix obtained after the $(n-1)^{th}$ update, where n≥2.

In some embodiments, the one or more programs further include instructions for performing the following operations: obtaining an initial identity vector of voice recorded in an identity registration process of a user, and normalizing the initial identity vector by using the determined normalization matrix; obtaining an identity vector of to-be-verified voice sent in an identity authentication process, and normalizing the identity vector of the to-be-verified voice by using the determined normalization matrix; and determining that a person inputting the to-be-verified voice has the same identity as the user when a similarity degree between the normalized identity vector of the to-be-verified voice and the normalized initial identity vector is greater than a second predetermined threshold.

In an exemplary embodiment, a non-transitory computer readable storage medium including instructions, for example, a memory including instructions, is further provided, where the instructions may be executed by a processor of a mobile terminal to complete the method for training a voiceprint recognition system. For example, the non-transitory computer readable storage medium may be a ROM, a RAM, a CD-ROM, a magnetic tape, a floppy disk, or an optical data storage device.

The terms "first", "second", and "third" are merely used for a distinguishing purpose, but shall not be interpreted as indicating or implying relative importance or implying the quantity of indicated technical features. Therefore, the defined features of "first", "second", and "third" may explicitly or implicitly include one or more of the features. In the description of the present disclosure, the "plurality" means two or more unless otherwise specified.

The sequence numbers of the foregoing embodiments of the present disclosure is merely for description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for training a voiceprint recognition system, executed by a computer system, comprising:
    obtaining a voice training data set, the voice training data set comprising a plurality of voice segments of a plurality of users;
    determining identity vectors of all the voice segments in the voice training data set;
    identifying identity vectors of a plurality of voice segments of a same user in the determined identity vectors;
    placing the recognized identity vectors of the same user in the plurality of users into one of a plurality of user categories;
    determining an identity vector in the user category as a first identity vector;
    normalizing the first identity vector by using a normalization matrix, a first value being a sum of similarity degrees between the first identity vector normalized by using the normalization matrix in the corresponding category and other identity vectors normalized by using the normalization matrix in the corresponding category; and training the normalization matrix, and outputting a training value of the normalization matrix when the normalization matrix maximizes a sum of first values of all the user categories.

2. The method according to claim 1, further comprising:

establishing a first function for determining a first value corresponding to each user category, wherein the normalization matrix is a random variable of the first function.

3. The method according to claim 2, further comprising:

establishing a first exponential function corresponding to a second identity vector, wherein the second identity vector is another identity vector in the category other than the first identity vector, an exponent of the first exponential function is an opposite number of the square of a modulus of a first vector difference, and the first vector difference is obtained by subtracting the first identity vector normalized by using the normalization matrix from the second identity vector normalized by using the normalization matrix;

establishing a second exponential function corresponding to a third identity vector, wherein the third identity vector is another identity vector in the category other than that of the second identity vector, an exponent of the second exponential function is an opposite number of the square of a modulus of a second vector difference, and the second vector difference is obtained by subtracting the first identity vector normalized by using the normalization matrix from the third identity vector normalized by using the normalization matrix; and establishing the first function corresponding to the category based on the first exponential function corresponding to the second identity vector and the second exponential function corresponding to the third identity vector.

4. The method according to claim 3, further comprising:

obtaining a denominator of a second function by adding up second exponential functions corresponding to all third identity vectors;

using a first exponential function corresponding to each second identity vector as a numerator of the second function, and establishing a second function corresponding to each second identity vector; and obtaining the first function corresponding to the category by adding up second functions corresponding to all second identity vectors.

5. The method according to claim 1, further comprising:

obtaining a third function by adding up first functions corresponding to all the categories, and determining a derivative function of the third function, wherein a random variable of the derivative function is the normalization matrix, and a dependent variable of the derivative function is a second value;

initializing the normalization matrix, and based on the initialized normalization matrix, calculating an initial value of a first value of each category by using a first function of the category, and calculating an initial value of the second value by using the derivative function; and determining, based on the initialized normalization matrix, the initial value of the second value, and the initial value of the first value of each category, the normalization matrix maximizing the sum of the first values of all the user categories.

6. The method according to claim 5, further comprising:

obtaining a new normalization matrix $A_n$ by adding up a second value $$\frac{\partial(f_3(A_{n-1}))}{\partial A_{n-1}}$$

and a normalization matrix $A_{n-1}$, wherein n=1, 2, . . . , $A_0$ is the initialized normalization matrix, and $$\frac{\partial(f_3(A_0))}{\partial A_0}$$

is the initial value of the second value;

calculating a new first value $f_{1m}(A_n)$ corresponding to each category by using the first function of each category, and calculating a second value $$\frac{\partial(f_3(A_n))}{\partial A_n}$$

by using the third function, wherein m=1, 2 . . . M, M is a total quantity of the categories, and $f_{1m}(A_0)$ is the initial value of the first value; and calculating a variation $f_{1m}(A_n)\_f_{1m}(A_{n-1})$ of the first value corresponding to each category, and determining, from normalization matrices obtained through the latest v times of addition, a normalization matrix if variations corresponding to each category that are calculated the latest v times are not all less than a first predetermined threshold, wherein v is a predetermined number.

7. The method according to claim 1, further comprising:

normalizing, by using the determined normalization matrix, an identity vector of voice obtained in the voiceprint recognition system.

8. The method according to claim 7, further comprising:

obtaining an initial identity vector of voice recorded in an identity registration process of a user, and normalizing the initial identity vector by using the determined normalization matrix; and obtaining an identity vector of to-be-verified voice sent in an identity authentication process, and normalizing the identity vector of the to-be-verified voice by using the determined normalization matrix; and determining that a person inputting the to-be-verified voice has the same identity as the user when a similarity degree between the normalized identity vector of the to-be-verified voice and the normalized initial identity vector is greater than a second predetermined threshold.

9. An apparatus for training a voiceprint recognition system, executed by a computer system, comprising:

a categorization module, configured to obtain a voice training data set, the voice training data set comprising a plurality of voice segments of a plurality of users; determine identity vectors of all the voice segments in the voice training data set; identify identity vectors of a plurality of voice segments of a same user in the determined identity vectors; and place the recognized identity vectors of the same user in the plurality of users into one of a plurality of user categories; and a determining module, configured to determine an identity vector in the user category as a first identity vector; normalize the first identity vector by using a normalization matrix, a first value being a sum of similarity degrees between the first identity vector normalized by using the normalization matrix in the corresponding category and the other identity vectors normalized by using the normalization matrix in the corresponding category; and train the normalization matrix, and output a training value of the normalization matrix when the normalization matrix maximizes a sum of first values of all the user categories.

10. The apparatus according to claim 9, further comprising:

an establishment module, configured to establish a first function for determining a first value corresponding to each user category, wherein the normalization matrix is a random variable of the first function.

11. The apparatus according to claim 10, wherein the establishment module comprises:

a first establishing unit, configured to establish a first exponential function corresponding to a second identity vector, wherein the second identity vector is another identity vector in the category other than the first identity vector, an exponent of the first exponential function is an opposite number of the square of a modulus of a first vector difference, and the first vector difference is obtained by subtracting the first identity vector normalized by using the normalization matrix by the second identity vector normalized by using the normalization matrix;

a second establishing unit, configured to establish a second exponential function corresponding to a third identity vector, wherein the third identity vector is another identity vector in the category other than the second identity vector, an exponent of the second exponential function is an opposite number of the square of a modulus of a second vector difference, and the second vector difference is obtained by subtracting the first identity vector normalized by using the normalization matrix by the third identity vector normalized by using the normalization matrix; and a third establishing unit, configured to establish the first function corresponding to the category based on the first exponential function corresponding to the second identity vector and the second exponential function corresponding to the third identity vector.

12. The apparatus according to claim 11, wherein the third establishing unit is configured to:

obtain a denominator of a second function by adding up second exponential functions corresponding to all third identity vectors;

use a first exponential function corresponding to each second identity vector as a numerator of the second function, and establish a second function corresponding to each second identity vector; and obtain the first function corresponding to the category by adding up second functions of all the second identity vectors.

13. The apparatus according to claim 9, wherein the determining module comprises:

a first determining unit, configured to obtain a third function by adding up first functions corresponding to all the categories, and determine a derivative function of the third function, wherein a random variable of the derivative function is the normalization matrix, and a dependent variable of the derivative function is a second value;

a calculation unit, configured to initialize the normalization matrix, and based on the initialized normalization matrix, calculate an initial value of a first value of each category by using a first function of each category, and calculate an initial value of the second value by using the derivative function; and a second determining unit, configured to determine, based on the initialized normalization matrix, the initial value of the second value, and the initial value of the first value of each category, the normalization matrix maximizing the sum of the first values of all the user categories.

14. The apparatus according to claim 13, wherein the second determining module is configured to:

obtain a new normalization matrix $$\frac{\partial (f_3(A_{n-1}))}{\partial A_{n-1}}$$

by adding up a second value $A_{n-1}$ and a normalization matrix $A_n$, wherein n=1, 2, ..., $A_0$ is the initialized normalization matrix, and $$\frac{\partial (f_3(A_0))}{\partial A_0}$$

is the initial value of the second value;

calculate a new first value $f_{1m}(A_n)$ corresponding to each category by using the first function of each category, and calculate a second value $$\frac{\partial (f_3(A_n))}{\partial A_n}$$

by using the third function, wherein m=1, 2 ... M, M is a total quantity of the categories, and $f_{1m}(A_0)$ is the initial value of the first value; and calculate a variation $f_{1m}(A_n)\_f_{1m}(A_{n-1})$ of the first value corresponding to each category, and determine, from normalization matrices obtained through the latest v times of addition, a normalization matrix if variations corresponding to each category that are calculated the latest v times are not all less than a first predetermined threshold, wherein v is a predetermined number.

15. The apparatus according to claim 9, further comprising:

a normalization module, configured to normalize, by using the determined normalization matrix, an identity vector of voice obtained in the voiceprint recognition system.

16. The apparatus according to claim 15, wherein the normalization module comprises:

a first normalization unit, configured to obtain an initial identity vector of voice recorded in an identity registration process of a user, and normalize the initial identity vector by using the normalization matrix determined by the determining module; and a second normalization unit, configured to obtain an identity vector of to-be-verified voice sent in an identity authentication process, and normalize the identity vector of the to-be-verified voice by using the normalization matrix determined by the determining module.

17. The apparatus according to claim 16, further comprising:
a determination module configured to determine that a person inputting the to-be-verified voice has the same identity as the user when a similarity degree between the normalized identity vector of the to-be-verified voice and the normalized initial identity vector is greater than a second predetermined threshold.

18. A non-transitory computer readable storage medium storing a computer program, and the computer program, when being executed by a processor, cause the processor to perform:
obtaining a voice training data set, the voice training data set comprising a plurality of voice segments of a plurality of users;
determining identity vectors of all the voice segments in the voice training data set;
identifying identity vectors of a plurality of voice segments of a same user in the determined identity vectors;
placing the recognized identity vectors of the same user in the plurality of users into one of a plurality of user categories;
determining an identity vector in the user category as a first identity vector;
normalizing the first identity vector by using a normalization matrix, a first value being a sum of similarity degrees between the first identity vector normalized by using the normalization matrix in the corresponding category and other identity vectors normalized by using the normalization matrix in the corresponding category; and
training the normalization matrix, and outputting a training value of the normalization matrix when the normalization matrix maximizes a sum of first values of all the user categories.

19. The storage medium according to claim 18, wherein the computer program further cause the processor to perform:
establishing a first function for determining a first value corresponding to each user category, wherein the normalization matrix is a random variable of the first function.

20. The storage medium according to claim 19, wherein the computer program further cause the processor to perform:
establishing a first exponential function corresponding to a second identity vector, wherein the second identity vector is another identity vector in the category other than the first identity vector, an exponent of the first exponential function is an opposite number of the square of a modulus of a first vector difference, and the first vector difference is obtained by subtracting the first identity vector normalized by using the normalization matrix from the second identity vector normalized by using the normalization matrix;
establishing a second exponential function corresponding to a third identity vector, wherein the third identity vector is another identity vector in the category other than that of the second identity vector, an exponent of the second exponential function is an opposite number of the square of a modulus of a second vector difference, and the second vector difference is obtained by subtracting the first identity vector normalized by using the normalization matrix from the third identity vector normalized by using the normalization matrix; and
establishing the first function corresponding to the category based on the first exponential function corresponding to the second identity vector and the second exponential function corresponding to the third identity vector.

* * * * *